United States Patent [19]
Patterson

[11] Patent Number: 6,142,575
[45] Date of Patent: Nov. 7, 2000

[54] SAFETY BELT ADJUSTER

[75] Inventor: Kimberly A. Patterson, Malibu, Calif.

[73] Assignee: Quaker State Investment Company, Houston, Tex.

[21] Appl. No.: 09/248,601

[22] Filed: Feb. 11, 1999

[51] Int. Cl.[7] .......................... A47C 31/00; B60R 22/00
[52] U.S. Cl. ................. 297/482; 280/801.1; 280/808
[58] Field of Search ..................... 297/482; 280/801.1, 280/808; 24/198, 200

[56] References Cited

U.S. PATENT DOCUMENTS

| | | |
|---|---|---|
| 4,595,618 | 6/1986 | Caringer . |
| 4,786,078 | 11/1988 | Schreier et al. ................ 280/808 |
| 4,953,816 | 9/1990 | Wilkinson . |
| 4,973,106 | 11/1990 | Strovinskas . |
| 4,984,849 | 1/1991 | Rist ................................. 297/482 |
| 5,005,866 | 4/1991 | Reedom . |
| 5,016,915 | 5/1991 | Perry ............................... 280/808 |
| 5,114,185 | 5/1992 | Reedom . |
| 5,178,439 | 1/1993 | McCracken ..................... 297/482 |
| 5,335,957 | 8/1994 | Golder ............................. 297/482 |
| 5,421,614 | 6/1995 | Zheng ............................ 280/801.1 |
| 5,463,369 | 10/1995 | Lamping . |
| 5,468,020 | 11/1995 | Scime .............................. 280/808 |

OTHER PUBLICATIONS

Axius/Auto–Shade, Safe–Adjust Children's Safety Belt Adjuster—Sales Packaging, (Sep. 1997).

*Primary Examiner*—Anthony D. Barfield
*Attorney, Agent, or Firm*—Jenkens & Gilchrist

[57] ABSTRACT

According to the present invention, a safety belt adjuster is provided. More specifically, a safety belt adjuster for receiving and properly positioning a conventional three-point seat belt about a child's body is provided. The safety belt adjuster ensures that the shoulder strap portion of the three-point seat belt is positioned across the child's shoulder rather than interfering with the child's neck or face. The safety belt adjuster comprises a body having an opening and an exit slot and a character safety adjuster accessory, wherein the character safety adjuster accessory is releasably attachable to the body. The safety belt adjuster may further comprise a divider, whereby the opening divides into a shoulder strap opening and a waist strap opening, and wherein the divider is releasably attachable to the body. The safety belt adjuster may be further modified such that the character safety adjuster accessory is releasably attachable to the reverse side of the body, thereby rendering the body reversible.

21 Claims, 5 Drawing Sheets

SAFETY BELT ADJUSTER

FIELD OF THE INVENTION

The present invention relates to an automobile seat belt adjuster, and specifically, a seat belt adjuster adapted for use with children. The seat belt adjuster is adapted to receive a conventional three-point seat belt and pulls the seat belt to a proper position around a child's shoulder and waist/abdomen so that the seat belt does not extend across and interfere with the child's neck and face.

BACKGROUND OF THE INVENTION

Conventional three-point automobile seat belts are normally provided with one original strap with a latch plate slidably positioned there along. When pulled, the latch plate divides the original strap into two straps, a waist strap and a shoulder harness or strap. To use the seat belt, an individual pulls the latch plate and fastens the latch plate to a buckle secured to a side of the automobile seat. When the latch plate is pulled, it slides along the original strap to adjust the respective lengths of the waist strap and the shoulder strap to the body size of the individual. When the latch plate is fastened to the buckle, the waist or abdomen strap is wrapped about the individual's waist to prevent the individual from being dislodged from the seat in the event of an accident. The shoulder strap is wrapped about the individual's shoulder and chest to prevent the individual's upper body and head from being thrown forward.

The term "waist strap" is used herein to describe the strap which secures the lower body of the individual to the seat. Depending on the physique of a particular individual, this strap may be either wrapped about the individual's waist or abdomen. In either case, the strap performs the same function.

Conventional automobile seat belts are well-adapted for use with adults of normal height. However, these conventional seat belts are not well suited for individuals who are very short, such as, for example, children who have outgrown conventional child restraining devices. When a conventional seat belt is fastened in place about a child, the slidable latch plate adjusts in a manner which may allow for the waist strap to hold securely the child's lower body in the seat. However, the shoulder strap will typically extend across the child's neck, face or both because his or her upper body is not quite as long as that of a taller person.

A shoulder strap which overhangs a child's neck or face is very annoying, uncomfortable, and dangerous. Because the shoulder strap is annoying and uncomfortable, it discourages the use of the seat belt. To avoid the overhanging shoulder strap, a child may wear the seat belt improperly by placing the shoulder strap behind his or her back so that it does not interfere with his or her face. This defeats the purpose of a shoulder strap because the child's upper body and head may be thrown forward in an accident.

Accordingly, there is a need for a device which is adaptable for use with a conventional three-point seat belt for adjusting the position of the shoulder strap so that it does not interfere with a child's face, which is simple for installation, and which encourages a child to use his or her seat belt properly.

SUMMARY OF THE INVENTION

According to the present invention, a safety belt adjuster is provided. More specifically, a safety belt adjuster for receiving and properly positioning a conventional three-point seat belt about a child's body is provided. The safety belt adjuster ensures that the shoulder strap portion of the three-point seat belt is positioned across the child's shoulder rather than interfering with the child's neck or face.

The safety belt adjuster comprises a body having an opening and an exit slot, a character safety adjuster accessory, and means for releasably attaching the character safety adjuster accessory to the body. The safety belt adjuster may further comprise a divider, whereby the opening divides into a shoulder strap opening and a waist strap opening and means for releasably attaching the divider to the body. The safety belt adjuster may further comprise means for releasably attaching the character safety adjuster accessory to the reverse side of the body, thereby rendering the body reversible.

BRIEF DESCRIPTION OF THE DRAWINGS

A better understanding of the present invention may be had by reference to the drawings wherein.

DESCRIPTION OF THE INVENTION

Figure 1:
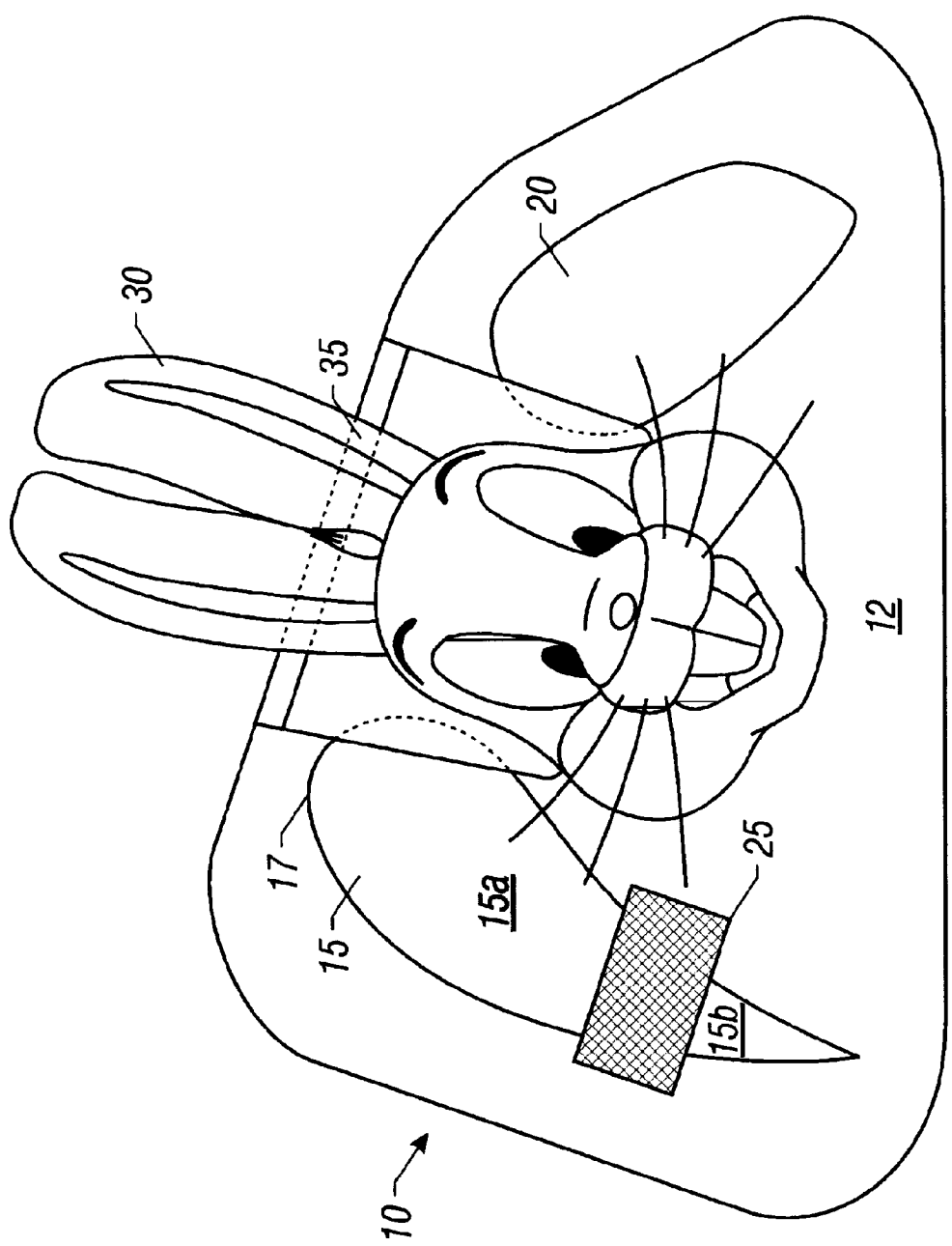
FIG. 1 is a perspective view of an embodiment of the safety belt adjuster of the present invention.

Referring now to FIG. 1, the safety belt adjuster 10 of the present invention for receiving and properly positioning a conventional three-point seat belt about a child's body is shown. The safety belt adjuster 10 is shown with a body 12 having opening 15 and exit slot 20 for receiving a conventional three-point seat belt. The body 12 is shown with an optional divider 25 which divides opening 15 into a shoulder strap opening 15a and a waist strap opening 15b. The safety belt adjuster 10 is also shown with a plush character safety belt accessory 30 releasably attached along the attaching means 35.

The body 12 of the safety belt adjuster 10 may be made from a variety of materials and may have a cavity for receiving padding. For example, the body 12 may be from materials which are soft and flexible, such as cloth, nylon, Mylar, PVC, rubber, leather or foam. If the body 12 has a cavity for receiving padding, the padding is preferably made from a soft material such as foam, rubber, soft plastic, or textiles. The body 12 and the padding are preferably soft, so that the safety belt adjuster 10 can rest comfortably in the waist and shoulder portion of the child.

The shape of the body 12 is generally not critical as long as it results in the proper positioning of the three-point safety belt about the child. The body 12 may assume a round, curved or other shape. In FIGS. 1–4, the body 12 is shown as a quadrilateral having sloped upper and side edges wherein the upper edge slopes down from the side adjacent opening 15.

Figure 2:
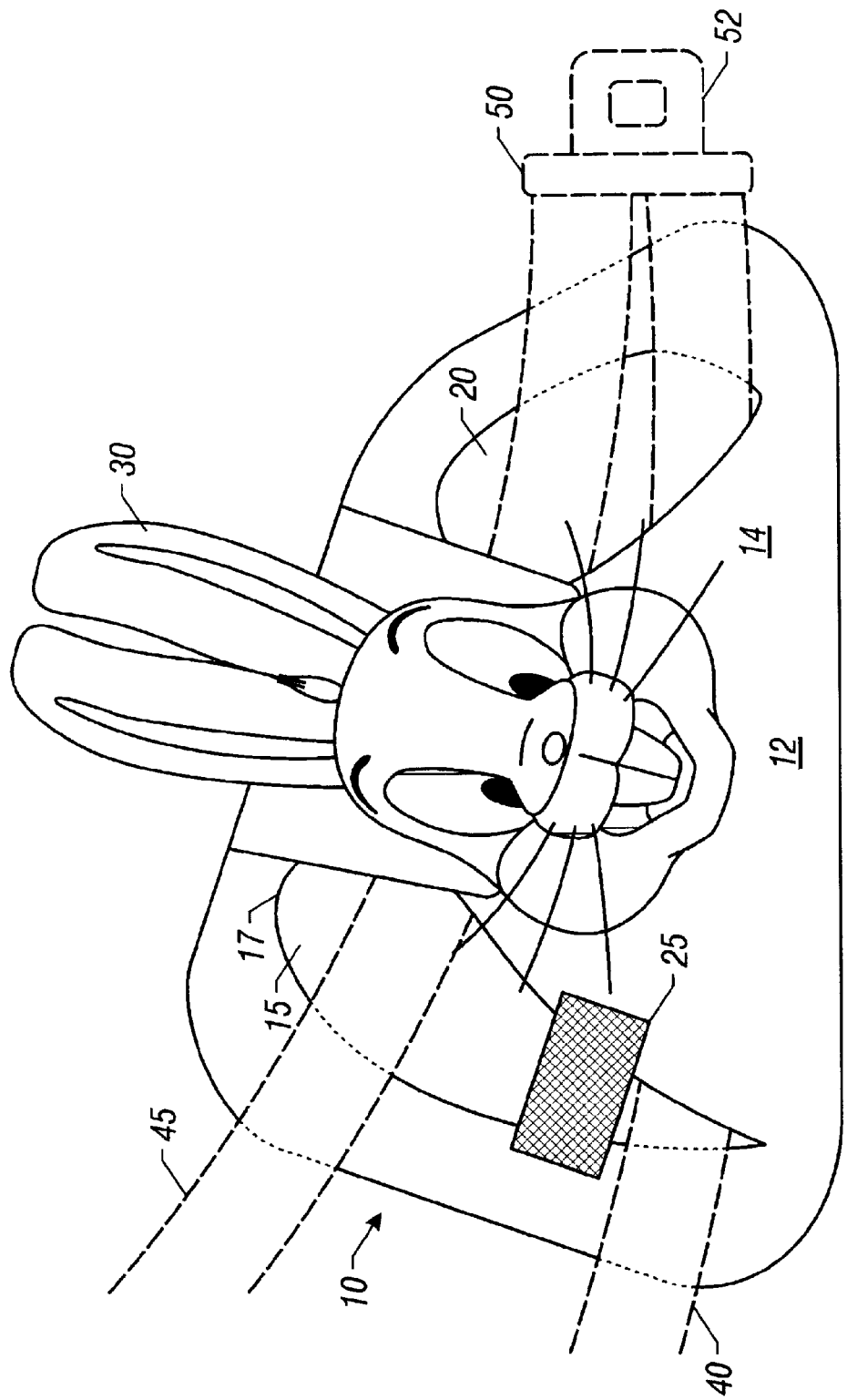
FIG. 2 is a perspective view of the safety belt adjuster shown in FIG. 1 with a three-point safety belt properly positioned in the safety belt adjuster.

The optional divider 25 may be of any means which releasably attached to the body 12. The divider 25 divides opening 15 into a shoulder strap opening 15a and a waist strap opening 15b. The divider 25 ensures proper spacing of the shoulder strap 45 from the waist strap 40 through opening 15 (as shown in FIG. 2). The divider 25 is preferably made of materials which are soft and flexible, such as cloth, nylon, Mylar, PVC, rubber, leather or foam.

Figure 3:
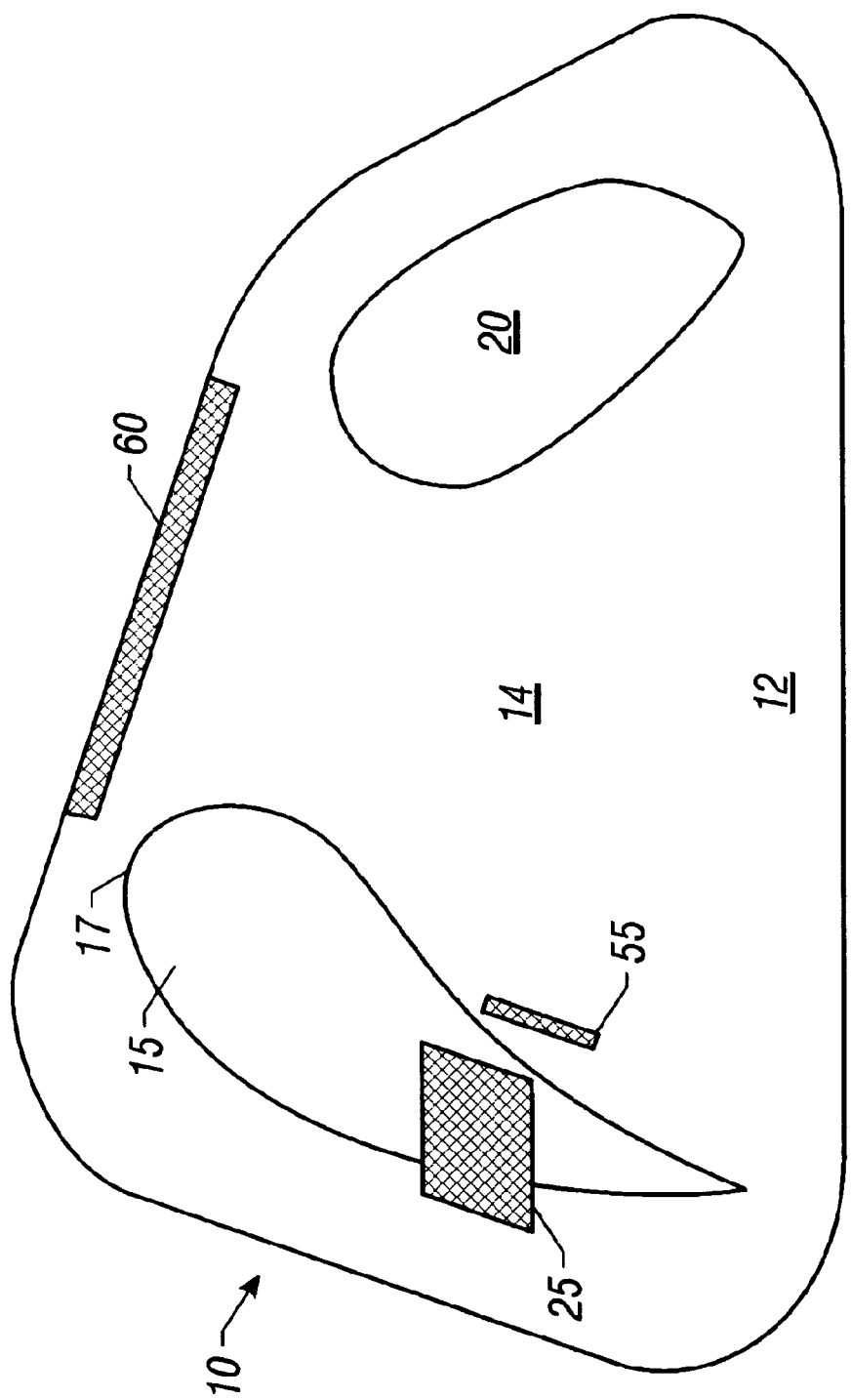
FIG. 3 is a front side view of the safety belt adjuster shown in FIG. 1 without a plush character safety belt accessory.

The divider 25 may be fixedly attached at one of its ends so the body 12 and releasably attached at its other end. The divider 25 may also be releasably attached to the body 12 at both of the divider's ends. In order to releasably attach the divider 25 to the body 12, loop-segments 55, such as Velcro®, can be employed, as shown in FIG. 3. Alternatively, snaps, buttons, hooks, or other fasteners may be used. The preferred embodiment is shown in FIG. 3, wherein the body 12 has a Velcro® pad (loop-segments 55) and the divider 25 has an opposing Velcro® pad (not shown).

The plush character safety belt accessory 30 is shown in the form of stuffed bunny character head. Other forms of novelty items are equally adaptable for use, such as stuffed toys and stuffed comic strip characters. The term "plush" is used herein to describe high-piled brushed polyester. Also, "non-plush" character safety belt accessory may also be used. That is, the non-plush character safety belt accessory may be made of such materials as nylon, Mylar, rubber, or leather.

Figure 5:
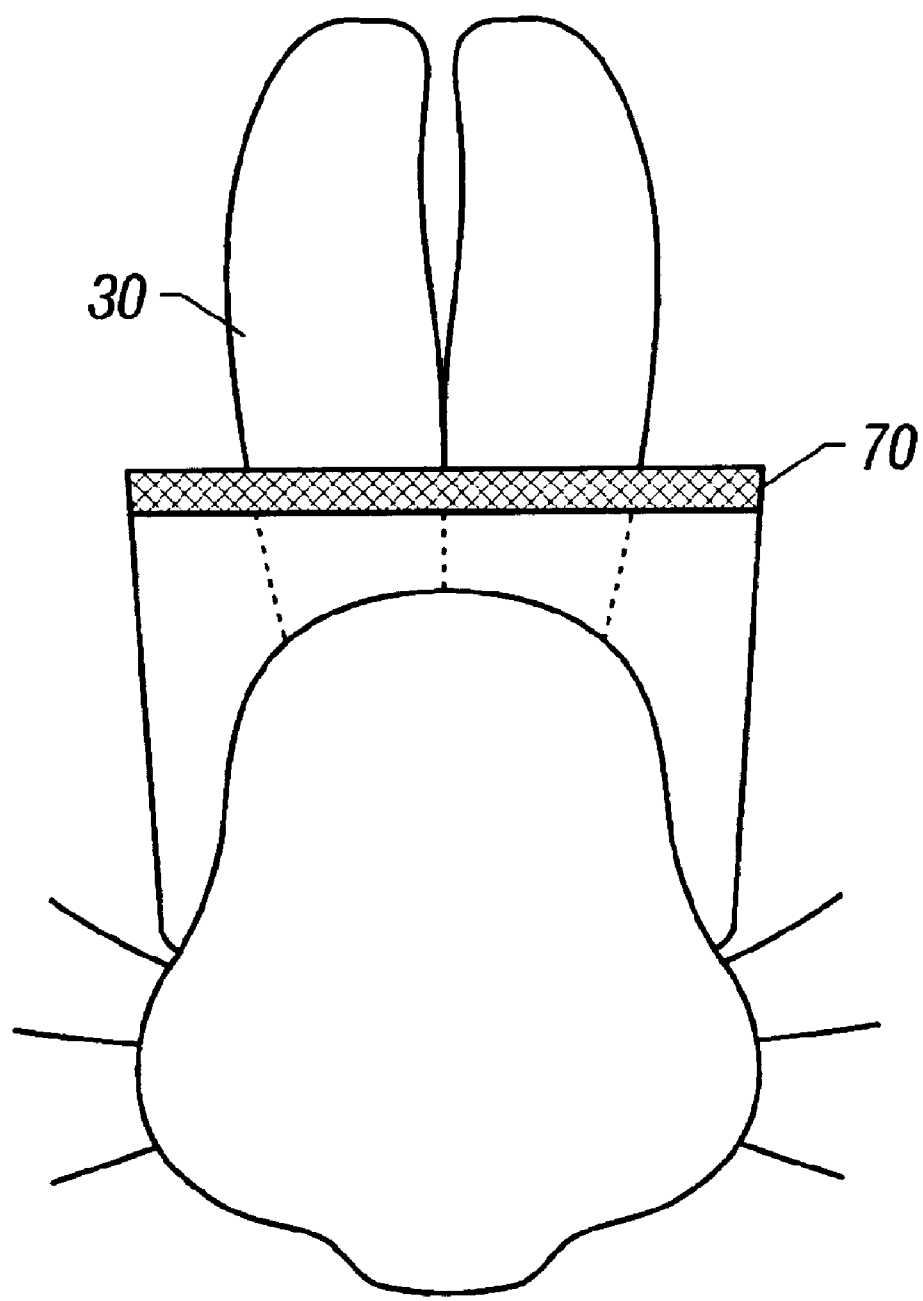
FIG. 5 is a reverse side view of a plush character safety belt accessory shown in FIG. 1.

The plush character safety belt accessory 30 is releasably attached to the body 12 of the safety belt adjuster 10 along the attaching means 35. In order to releasably attach the plush character safety belt accessory 30 to the body 12, loop-segments 60. such as Velcro®, can be employed, as shown in FIG. 3. Alternatively, snaps, buttons, hooks, or other fasteners may be used. The preferred embodiment is shown in FIG. 3, wherein the body 12 has a Velcro® pad (loop-segments 60) and the plush character safety belt accessory 30 has an opposing Velcro® pad (shown in FIG. 5).

As shown in FIG. 2, the safety belt adjuster 10 of the present invention is shown with a three-point seat belt 50 properly positioned in the safety belt adjuster 10. The three-point seat belt 50 has a shoulder strap 45, a waist strap 40, and a latch plate 52. The optional divider 25 properly spaces the shoulder strap 45 from the waist strap 40. The upper edge 17 of opening 15 ensures that the shoulder strap 45 is properly positioned across a child's shoulder rather than improperly interfering a child's neck or head.

To place the three-point seat belt 50 about a child using the safety belt adjuster 10, the three-point seat belt 50 is drawn over the front side 14 of the safety belt adjuster 10, through opening 15, underneath the middle portion of the safety belt adjuster 10, and through exit slot 20. The latch plate 52 is then releasably engaged with its mated buckle (not shown). The divider 25 is releasably attached to the body 12 to ensure proper spacing of the shoulder strap 45 from the waist strap 40. The plush character safety belt accessory 30 is releasably attached to the front side 14 of the safety belt adjuster along the attaching means 35.

Figure 4:
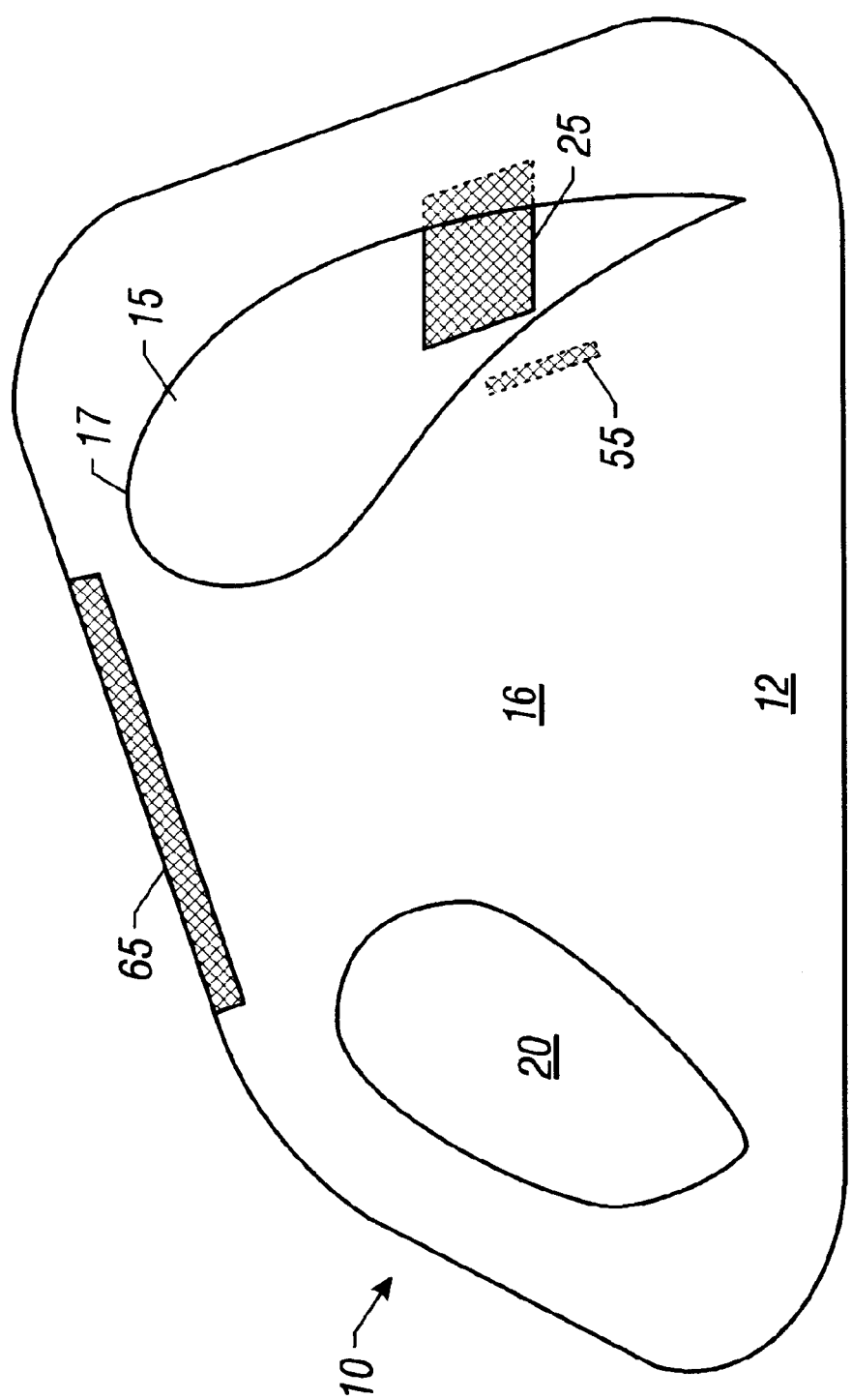
FIG. 4 is a reverse side view of the safety belt adjuster shown in FIG. 1 without a plush character safety belt accessory.

As shown in FIG. 3, the front side view of the safety belt adjuster 10 is shown without a plush character safety belt accessory 30. In FIG. 4, the reverse side view of the safety belt adjuster 10 is shown. On the front side 14, the safety belt adjuster 10 has a front attaching means 60 for releasably attaching a plush character safety belt accessory 30 to the safety belt adjuster 10. The reverse side 16 of the safety belt adjuster 10 has reverse attaching means 65 for releasably attaching a plush character safety belt accessory 30 to the safety belt adjuster 10. Front attaching means 60 and reverse attaching means 65 allow the plush character safety belt accessory to be releasably attached to either side of the safety belt adjuster 10. The ability to releasably attach the plush character safety belt accessory 30 to either side of the safety belt adjuster 10 permits a child to use the accessory without regard to which side of the vehicle he or she is sitting.

Conventionally, the three-point seat belt has a shoulder strap and a waist strap which extends from the outer portion of the vehicle toward a buckle located near the center of the vehicle. That is, when a child sits on the right side of the vehicle, the shoulder strap and the waist strap come across the child from his or her right side and the latch plate engages a mated buckle on the child's left side. When the child is sitting on the left side of the vehicle, the shoulder strap and the waist strap come across the child from his or her left side and the latch plate engages a mated buckle on the child's right side. To use the safety belt adjuster 30 of the present invention on either side of the vehicle, the parent may simply flip over the safety belt adjuster 30 such that on the right side of the vehicle opening 15 is nearer the door and on the left side of the vehicle the opening 15 can become nearer the door and the three-point seat belt may always go through opening 15 first and exit slot 20 second. The plush character safety belt accessory 30 is then simply attached along the attaching means 35.

The embodiments described herein are illustrative of the invention and are not intended to limit the claimed invention in any way. Other embodiments will be apparent to those skilled in the art.

What is claimed is:

1. A safety belt adjuster which receives and positions a seat belt comprising a body having an opening and an exit slot formed therein and being spaced apart, the body having a front side and a back side;

a character safety adjuster accessory releasably attached to a portion of the body, and means for releasably attaching the character safety adjuster accessory to the body, wherein the opening is adaptable for receiving a seat belt from the front side, and the exit slot is adaptable for allowing the seat belt to exit from the back side, whereby the body is slidably attached to the seat belt which extends through the opening and the exit slot.

2. The safety belt adjuster of claim 1 further comprising a divider which separates the opening into a shoulder strap opening and a waist strap opening, and means for releasably attaching the divider to the body.

3. The safety belt adjuster of claim 1, wherein the body is soft and flexible.

4. The safety belt adjuster of claim 1, wherein the releasably attaching means is selected from the group consisting of hook and loop segments, snaps, buttons, and hooks.

5. The safety belt adjuster of claim 1, further comprises means for releasably attaching the character safety adjuster accessory to the back side.

6. The safety belt adjuster of claim 5, wherein the means for releasably attaching the character safety adjuster accessory to the back side is selected from the group consisting of hook and loop segments, snaps, buttons, and hooks.

7. The safety belt adjuster of claim 1, wherein the character safety adjuster accessory is plush.

8. The safety belt adjuster of claim 1, wherein the body of the safety belt adjuster includes a cavity containing padding, wherein the padding is selected from the group consisting of foam, rubber, soft plastic, and textiles, and wherein the cavity is not adaptable for receiving the seat belt.

9. A safety belt adjuster which receives and positions a seat belt comprising a body having an opening and an exit slot formed therein and being spaced apart, the body having a front side and a back side;

a plush character safety adjuster accessory releasably attached to a portion of the body;

a first means for releasably attaching the plush character safety adjuster accessory to the front side of the body;

a second means for releasably attaching the plush character safety adjuster accessory to the back side, thereby rendering the body reversible;

a divider releasably attached to the opening, the divider separating the opening into a shoulder strap opening and a waist strap opening; and a third means for releasably attaching the divider to the body, wherein the opening is adaptable for receiving a seat belt from the front side, and the exit slot is adaptable for allowing the seat belt to exit from the back side, whereby the body is slidably attached to the seat belt which extends through the opening and the exit slot.

10. The safety belt adjuster of claim 9, wherein the first, second, and third releasably attaching means are selected from the group consisting of hook and loop segments, snaps, buttons, and hooks.

11. The safety belt adjuster of claim 10, wherein the plush character safety adjuster accessory is selected from the group consisting of a stuffed toys and stuffed comic strip characters.

12. A safety belt adjuster which receives and positions a seat belt comprising:

a substantially flat body having an opening and an exit slot formed therein and spaced apart, the body having a front side and a back side;

a character safety adjuster accessory releasably attached to a portion of the body;

a first means for releasably attaching the character safety adjuster accessory to the front side of the body;

a second means for releasably attaching the character safety adjuster accessory to the back side, thereby rendering the body reversible;

a divider releasably attached to the opening, the divider separating the opening into a shoulder strap opening and a waist strap opening, and a third means for releasably attaching the divider to the body wherein the opening is adaptable for receiving the seat belt from the front side, and the exit slot is adaptable for allowing the seat belt to exit from the back side, whereby the body is slidably attached to the seat belt which extends through the opening and the exit slot.

13. The safety belt adjuster of claim 12, wherein the first, second, and third releasably attaching means are selected from the group consisting of hook and loop segments, snaps, buttons, and hooks.

14. A safety belt adjuster which receives and positions a seat belt comprising:

a body having an opening and an exit slot formed therein and being spaced apart, the body having a front side and a back side;

a character safety adjuster accessory releasably attached to a portion of the body; and means for releasably attaching the character safety adjuster accessory to the body, wherein the opening is adaptable for receiving the seat belt from the back side, and the exit slot is adaptable for allowing the seat belt to exit from the front side, whereby the body is slidably attached to the seat belt which extends through the opening and the exit slot.

15. The safety belt adjuster of claim 14, further comprising a divider which seperates the opening into a shoulder strap opening and a waist strap opening, and means for releasably attaching the divider to the body.

16. The safety belt adjuster of claim 14, wherein the body is soft and flexible.

17. The safety belt adjuster of claim 14, wherein the releasably attaching means is selected from the group consisting of hook and loop segments, snaps, buttons, and hooks.

18. The safety belt adjuster of claim 14, further comprises means for releasably attaching the character safety adjuster accessory to the front side.

19. The safety belt adjuster of claim 18, wherein the means for releasably attaching the character safety adjuster accessory to the front side is selected from the group consisting of hook and loop segments, snaps, buttons, and hooks.

20. The safety belt adjuster of claim 14, wherein the character safety adjuster accessory is plush.

21. The safety belt adjuster of claim 14, wherein the body of the safety belt adjustor includes a cavity containing padding, wherein the padding is selected from the group consisting of foam, rubber, soft plastic, and textiles, and wherein the cavity is not adaptable for receiving the seat belt.

* * * * *